Jan. 2, 1968 T. TOTH 3,361,021
PLACE MAT OR DOILY DISPENSING APPARATUS
Filed Dec. 17, 1965 6 Sheets-Sheet 1
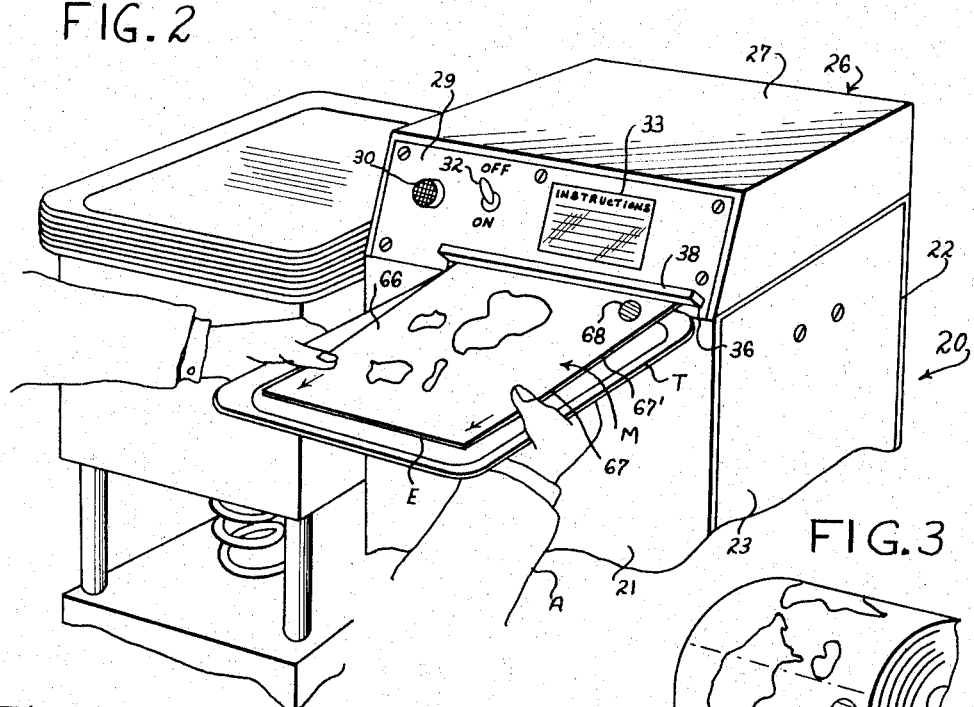
FIG. 2
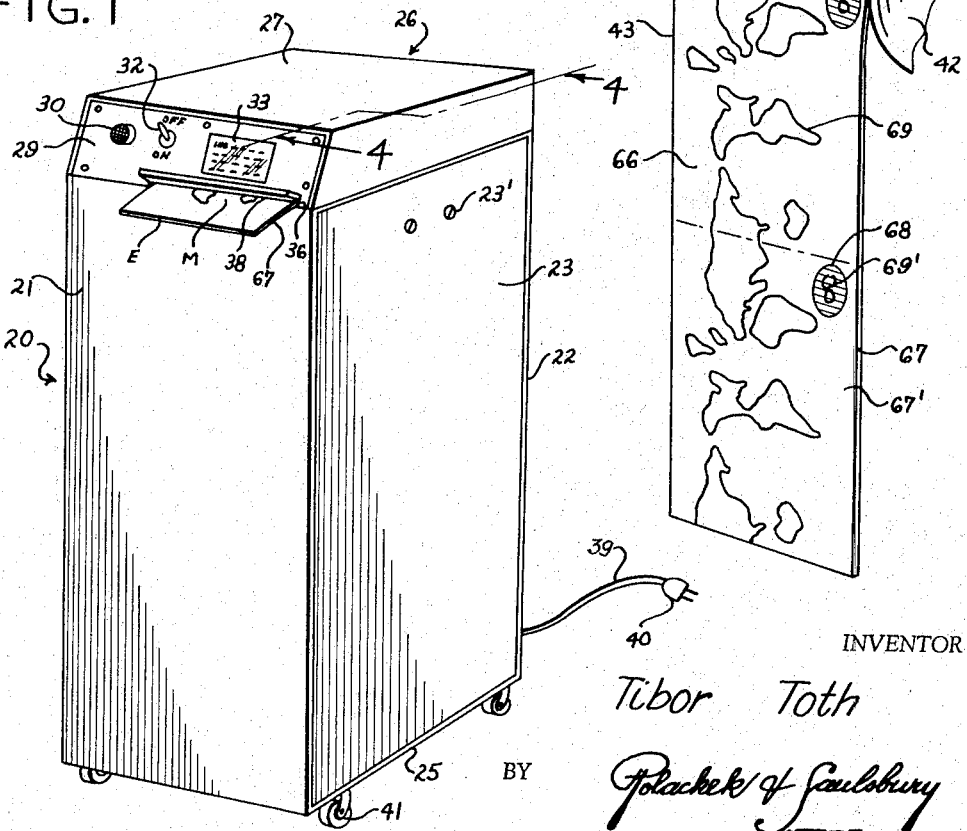
FIG. 1
FIG. 3
INVENTOR
Tibor Toth
BY Polachek & Saulsbury
ATTORNEYS Jan. 2, 1968 T. TOTH 3,361,021
PLACE MAT OR DOILY DISPENSING APPARATUS
Filed Dec. 17, 1965 6 Sheets-Sheet 2
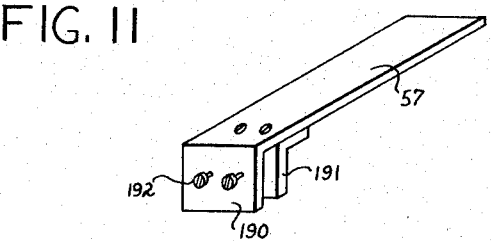
FIG. 11
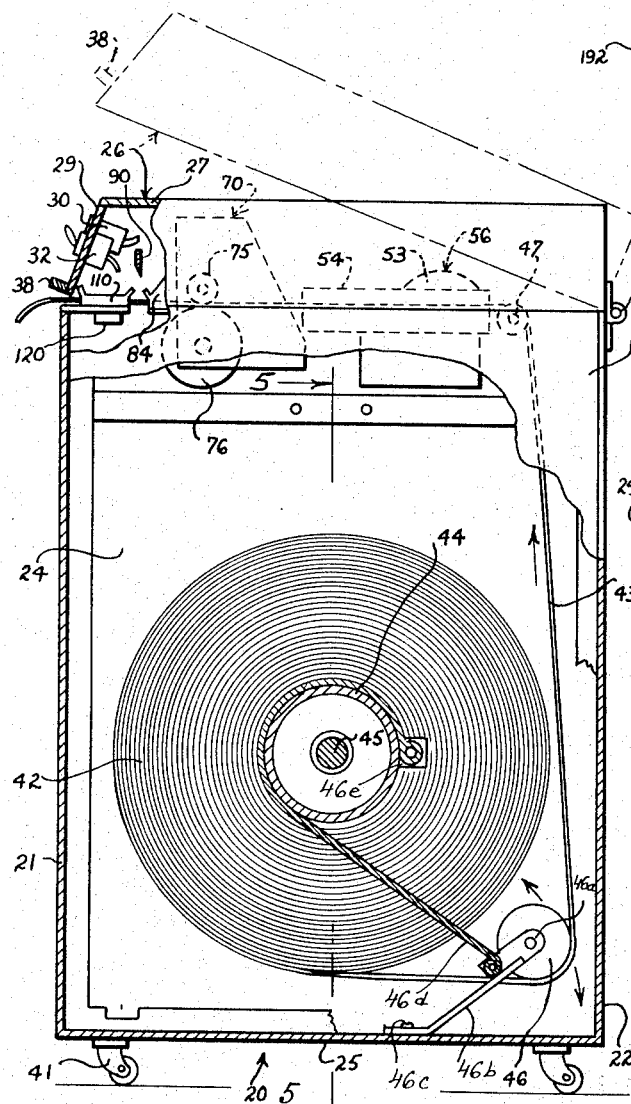
FIG. 5
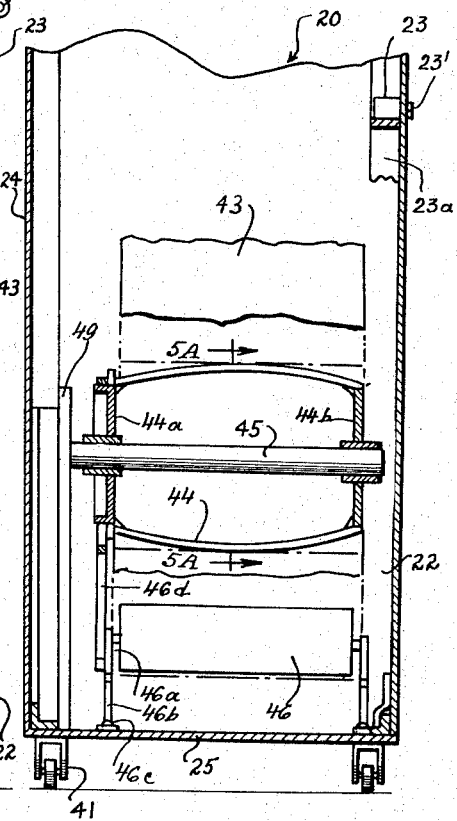
FIG. 4
FIG. 5A.
INVENTOR
Tibor Toth
BY
Polachek & Saulsberg
ATTORNEYS INVENTOR
Tibor Toth

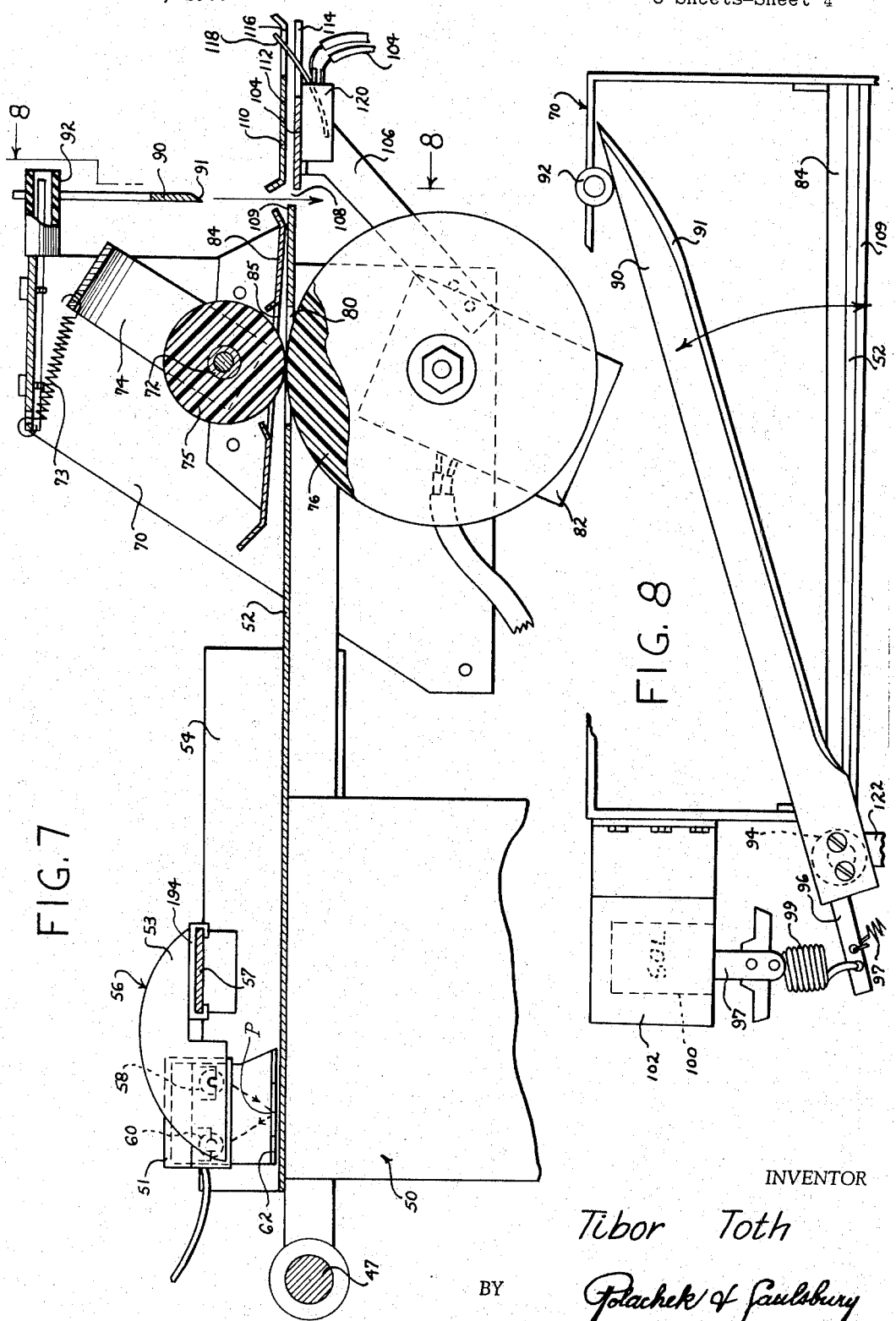

Jan. 2, 1968 T. TOTH 3,361,021
PLACE MAT OR DOILY DISPENSING APPARATUS
Filed Dec. 17, 1965 6 Sheets-Sheet 5

INVENTOR
Tibor Toth
BY
Polachek & Saulsbury
ATTORNEYS

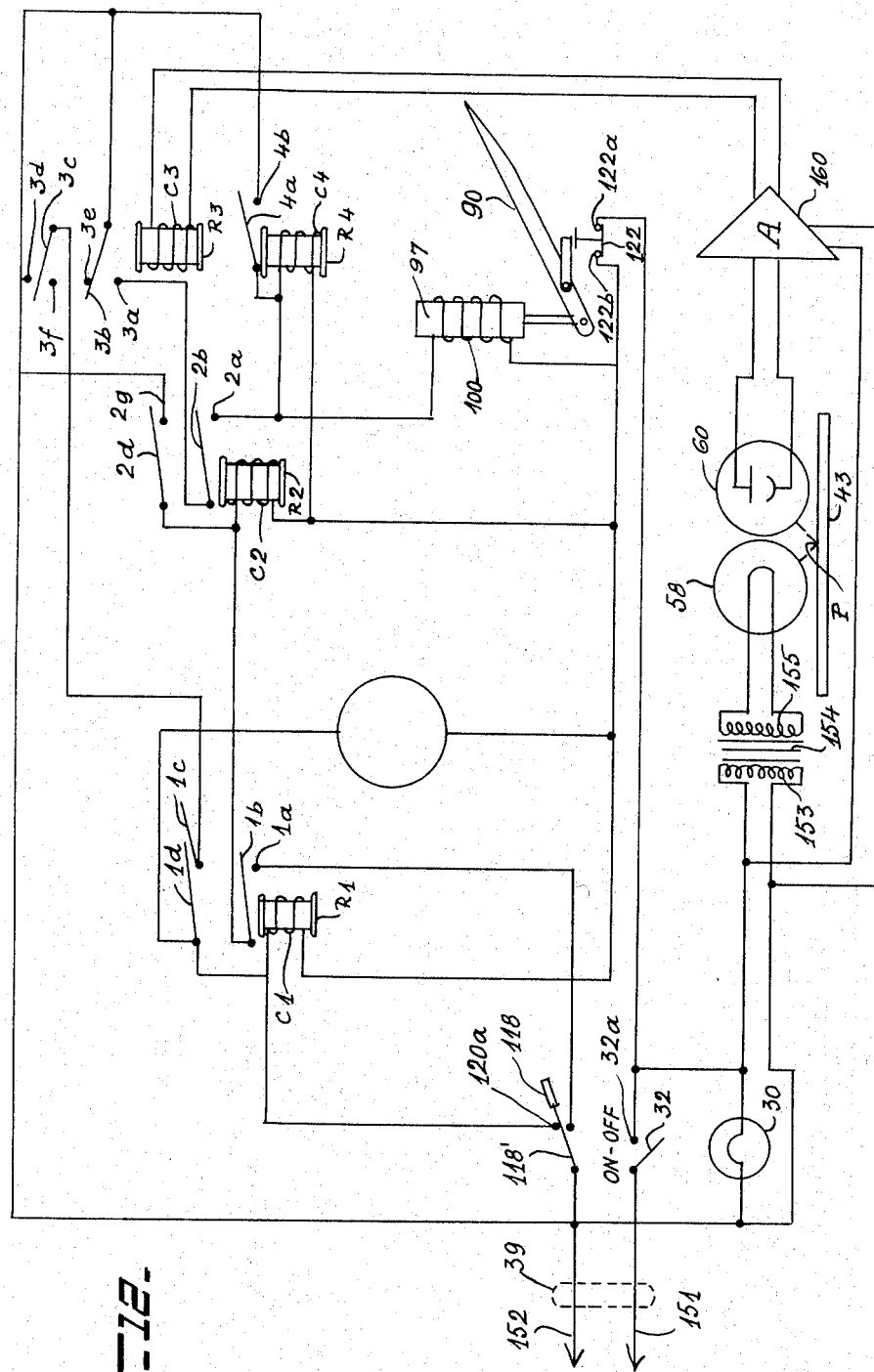

| United States Patent Office | 3,361,021 |
|---|---|
| | Patented Jan. 2, 1968 |

3,361,021
PLACE MAT OR DOILY DISPENSING APPARATUS
Tibor Toth, Glens Falls, N.Y., assignor to Valcour Imprinted Papers, Inc., Glens Falls, N.Y., a corporation of New York
Filed Dec. 17, 1965, Ser. No. 514,532
10 Claims. (Cl. 83—358)

This invention relates to the art of sheet feeding or dispensing apparatus and more particularly concerns apparatus for cutting individual mats from a paper or plastic web and dispensing the mats one at a time from the apparatus.

It has been known heretofore to employ mats or doilies made of polystyrene film as liners for plastic trays used for serving food. Extensive use has been made of such mats in airliners where food is served. These mats have the desirable characteristic that they tend to cling to the plastic trays, due to electrostatic attraction. Considerable difficulty has been encountered in manipulating and handling these thin mats when they are supplied in stacks. The thin mats cannot be lifted easily one at a time from a stack because they tend to cling to each other. Also it is difficult to apply the mats to the trays because they tend to wrinkle and to cling to other objects and articles. Thus much time and effort must be expended to apply individual mats to trays. Where a large number of trays must be lined with mats quickly, neatly and in unsoiled and unwrinkled condition, the difficulties attendant upon applying the mats to the trays become quite objectionable.

The present invention has a principal object overcoming the above and other difficulties and disadvantages, by providing a novel apparatus in which the plastic or paper web wound in a roll is automatically unrolled and transported through the apparatus, an individual mat is automatically cut off and the mat is disposed in dispensing position.

Another object is to provide apparatus as described, wherein manual removal of an individual mat from the apparatus automatically actuates sheet feeding means to unroll the web from the roll and to pass it to a cutting position where a single mat is automatically cut off.

A further object is to provide apparatus as described including a control circuit having sensing means for actuating the circuit to stop the sheet feeding means and to actuate sheet cutting means.

Another object is to provide apparatus as described wherein the sensing means may be: (a) photoelectric means responsive to the presence of visible or invisible ink markings on the web; (b) adjustable length measuring means for measuring predetermined lengths of an unmarked web; (c) electric current responsive sending means responsive to the presence of conductive ink markings on the web; (d) electromagnetic sensing means responsive to the presence of magnetic ink markings on the web; (e) or other equivalent sensing means.

A further object is to provide apparatus as described wherein the roll of paper or plastic sheet material is mounted on a support provided with braking means to prevent free unwinding of the roll in the absence of a positive pull from the sheet feeding means, and in which a spring biased roller keeps the sheet or web tensioned at all times.

Other objects are: to provide apparatus as described housed in compact, attractive cabinet; to provide a novel electric control circuit for the apparatus; to provide a plastic mat dispensing apparatus which is easily loaded with mats in roll form; to provide an apparatus as described which is sanitary and safe to use which requires no particular skill to use, which is light in weight, easily assembled, easily cleaned, and easily serviced.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of an apparatus embodying the invention.

FIGURE 2 is an enlarged, fragmentary perspective view of the apparatus showing the same in use.

FIG. 3 is a fragmentary perspective view of a roll of plastic film such as employed in the apparatus.

FIG. 4 is an enlarged vertical sectional view taken on line 4—4 of FIG. 1.

FIG. 5 is a fragmentary vertical sectional view taken on the line 5—5 of FIG. 4.

FIG. 5A is a sectional view taken on line 5A—5A of FIG. 5.

FIG. 7 is a further enlarged fragmentary vertical sectional view taken on line 7—7 of FIG. 6.

FIG. 8 is a fragmentary sectional view taken on line 8—8 of FIG. 7.

FIG. 11 is a reduced perspective view of a support bar for a photoelectric assembly.

FIG. 12 is a diagram of an electric circuit employed in the apparatus.

Figure 6:
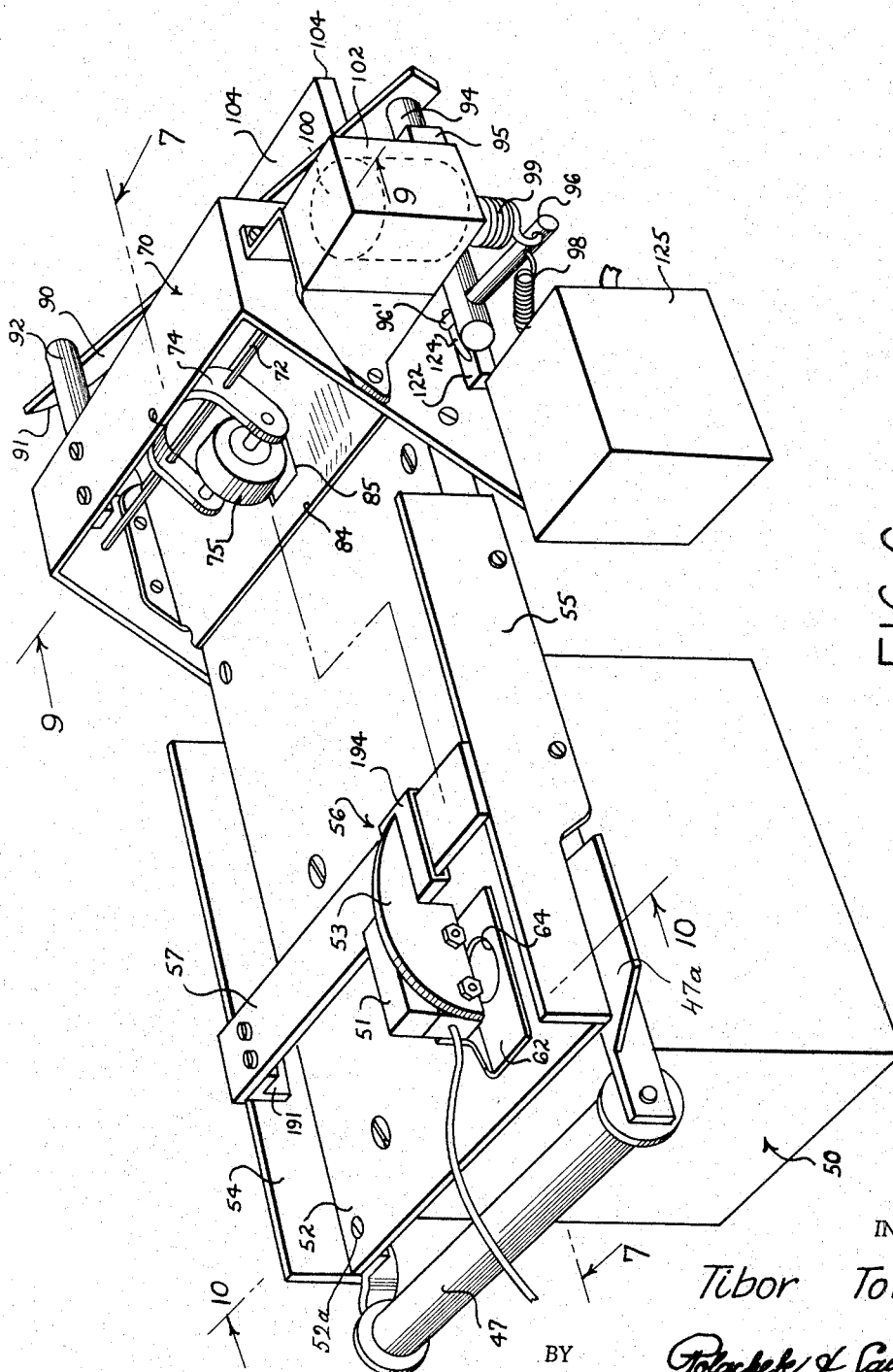
FIG. 6 is an enlarged perspective view of a top portion of the apparatus with cover removed.

Referring first to FIGS. 1, 2, 4, 5, there is shown the apparatus embodying the invention, comprising a generally rectangular cabinet 20 with vertical front wall 21, rear wall 22, side walls 23, 24, bottom 25 and a top cover 26. Screws 23' carry a permanent magnet 23'' inside the side wall 23. This magnet engages framework 23a inside the cabinet so that side wall 23 is held removably on the cabinet; see FIG. 5. The cover 26 is a box-like member closed at the top 27 and open at the bottom. The cover pivots on hinges 28 secured at the back of the cover and to rear wall 22. A removable sloping panel 29 at the front of the cover carries a pilot lamp 30 and ON-OFF switch 32. An observation window 33 is provided on panel 29. A long notch 36 is formed at the bottom of the panel defining a slot through which leasing end E of a mat M projects for manual removal of the mat onto a tray T supported by an attendant A as shown in FIG. 2. A guide bar 38 for the mat projects outwardly of panel 29 at the upper edge of notch 36. Power is supplied to the apparatus via an electric cord 39 terminating in a plug 40 which can be inserted into an appropriate power supply outlet. The cabinet is supported on casters 41.

Inside the cabinet is roll 42 of sheet material 43. The roll is supported by four bowed leaf springs 44 spaced circumferentially 90° apart around a brake drum 44a and a disk 44b supported by a stationary shaft 45 on post 49; see FIGS. 4, 5, 5A. The sheet material or web 43 is entrained around a tensioning roller 46 near the bottom of the cabinet. Roller 46 is supported by arms 46a carried by two leaf springs 46b at opposite ends of the roller. The leaf springs are anchored to the bottom 25 of the cabinet, by screws 46c. A brake band 46d extends around the brake drum. One end of the band is anchored on a lug 46e extending radially outward of the brake drum. The other end of the brake band is secured to one of arms 46a. The roller 46 is spring biased downwardly by springs 46b. This keeps the brake band tensioned around the brake drum, so that the brake drum is held frictionally against rotation. When the web stops, the roller 46 will be pressed down by the springs 46b. This will in turn tension brake band 46d around the brake drum 44a. Thus the brake band in cooperation with the roller 46 keeps the web tension constant while the web is moving and while it is stopped.

The four roll support springs 44 are longitudinally bowed or curved so that they press outwardly on the inside of the roll to keep the roll in position. The bowed springs compensate for differences in internal diameters of different rolls 42.

Figure 10:
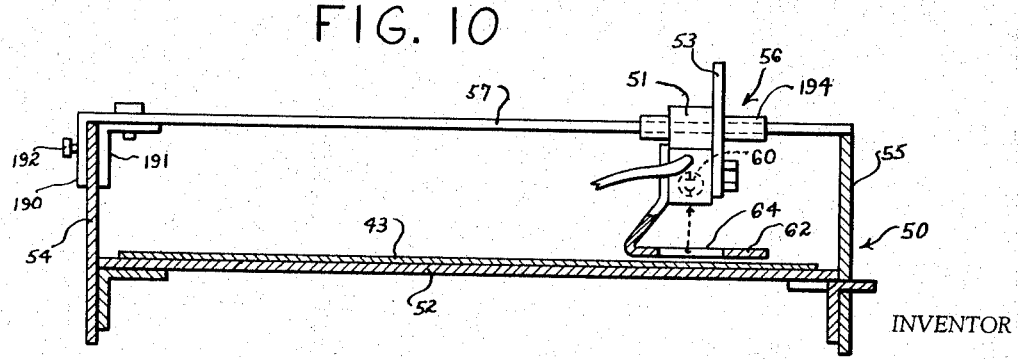

The web 43 extends upwardly from the roller 46 near the back of the cabinet to a flanged idler roller 47; see FIGS. 4, 6 and 7. The roller 47 is mounted at the back of framework 50 just rearwardly of horizontal table plate or platform 52. The roller 47 keeps the web centered on platform 52. Roller 47 is mounted by brackets 47a under platform 52. Screws 52a adjustably engage the brackets for adjustably positioning the roller 47 with respect to the platform 52. Framework 50 includes two long vertical side walls 54 and 55. Walls 54, 55 support an assembly 56 including a housing 51, plate 53 and bar 57. In housing 51 is a lamp 58 and photoelectric cell 60; see FIG. 7. At the bottom of assembly 56 is a horizontal plate 62 which serves as a guide for the web 43 on table 52. A hole 64 is provided in the plate 62. Through this hole is exposed a portion of the web which is scanned by the lamp and photoelectric cell; see FIGS. 7 and 10. Light emitted by the lamp is reflected from the portion of web exposed at hole 64. The reflected light impinges upon the photoelectric cell.

The web 43 is shown to best advantage in FIG. 3. The web is made of opaque sheet plastic material. Sensing spots 68 are spaced apart longitudinally of the web on surface 66 near one edge 67. Elsewhere on the web may be applied advertising matter 69 or other indicia. However, the marginal area 67' of surface 66 between the successive spots 68 is clear of such indicia. Identification symbols 69' may be superimposed on spots 68.

A generally U-shaped inverted frame member 70 is located near the front end of the framework 50. This frame member carries a shaft 72 supporting a yoke 74 in which is an idler pressure roller 75 urged down by spring 73. Roller 75 is axially horizontal and contacts an axially horizontal drive roller 76 located under the table 52 and exposed to roller 75 through a rectangular hole 80 in the table; see FIGS. 6, 7 and 9. The drive roller 76 is carried and driven by an electric motor 82 supported at the underside of the table 52. A film guide plate 84 is supported by the frame member 70. Plate 84 has a hole 85 through which roller 75 extends; see FIG. 7.

A knife 90 is supported in a normally upwardly inclined position just forwardly of roller 75. The cutting edge 91 of the knife faces downwardly. The free upper end of the knife contacts a resilient bumper 92 at the top of frame member 70. The knife is pivotally mounted on shaft 94 to rotate in a substantially vertical plane. Shaft 94 is axially horizontal or almost so and is carried by bearing 95; see FIGS. 6 and 9. A short rod 96 extends diametrally through shaft 94 and is engaged by its outer end by a coil spring 98 which is tensioned to hold the knife in an upwardly inclined position. Adjacent to spring 98 is a short tight spring 99 which connects rod 96 to plunger 97 of a solenoid 100 enclosed in a housing 102 at the side of frame member 70. When the solenoid 100 is energized the plunger 97 is drawn upwardly and the knife pivots downwardly in a clockwise direction viewed in FIG. 9 to cut film 43 under the knife. Spring 99 serves as a shock absorber between plunger 97 and knife 90.

A forward plate 104 supported by bracket 106 is disposed in advance of table 52 and coplanar therewith. A narrow space 108 is provided between plate 104 and the forward edge 109 of the table through which the knife descends; see FIG. 7. Edge 109 serves as a cooperating cutting edge with knife edge 91. Another film guide plate 110 is provided parallel to plate 94 and spaced therefrom.

Figure 9:
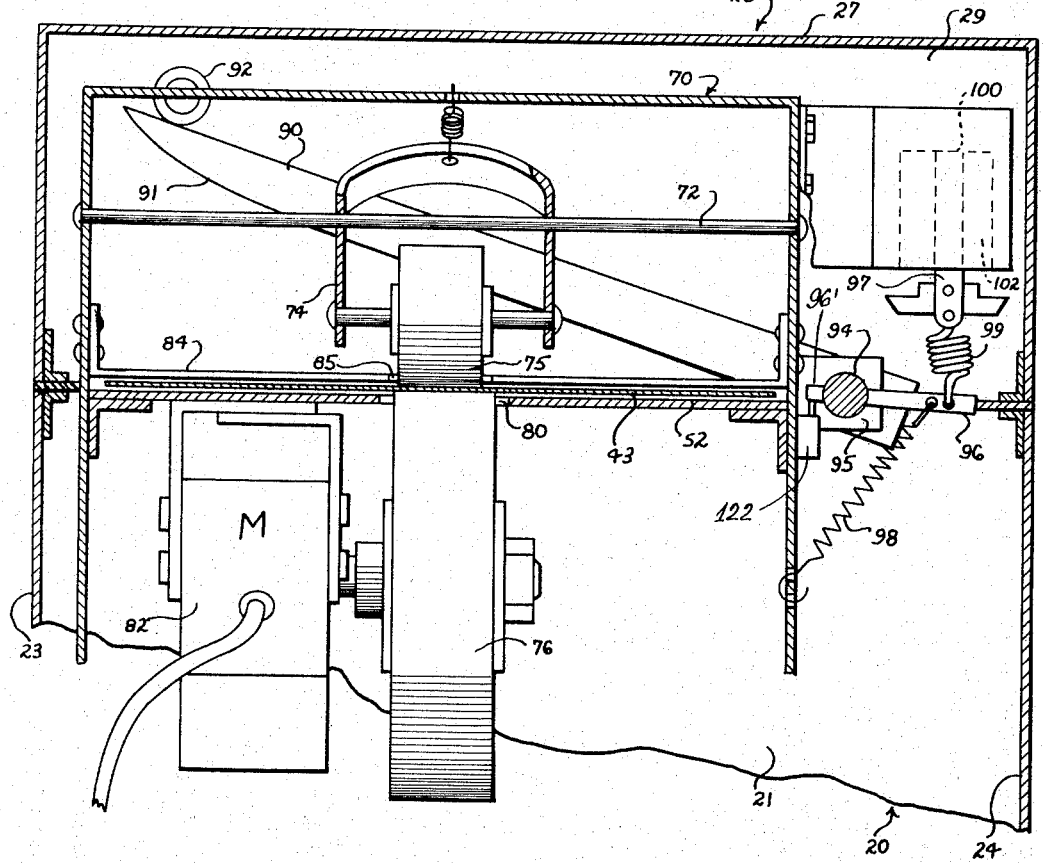
FIG. 9 and FIG. 10 are further enlarged fragmentary vertical sectional views taken on lines 9—9 and 10—10 of FIG. 6.

Plate 110 is supported over plate 104 to define a narrow passage 112 for the web 43. Aligned slots 114 and 116 are centrally located in plates 104 and 110 through which slots extends an inclined flexible switch arm 118. The arm 118 is part of switch 120 mounted under plate 104. Another switch 122 shown in FIGS. 6, 8 and 9 is mounted on frame member 70. This switch has an operating arm or lever 124 disposed under inner end 96' of rod 96. When the knife is pivoted downwardly to cut film 43, the end 96' of rod 96 actuates switch 122 only at the end of downward travel of the knife. A relay and circuit box 125 is mounted on the side of frame member 70 rearwardly of switch 122.

FIG. 12 shows circuit 150 in which the several electrical components of the apparatus are connected. Electric cord 39 has one wire 151 connected to the ON-OFF switch 32. The other wire 152 is connected to switch contact 118' to which arm 118 is connected in switch 120. Pilot lamp 30 is connected across wires 151, 152 and lights up when switch 32 is closed. Switch 120 has two fixed contacts 120a, 120b which are alternately contacted by switch contact 118'. The primary winding 153 of transformer 154 is connected to wires 151, 152. The secondary winding 155 of the transformer is connected to lamp 58 which illuminates and scans the web 43.

The circuit includes four relays R1–R4. Relay R1 has movable contacts 1b, 1d normally open with respect to fixed contacts 1a, 1c respectively. Relay R2 has movable contacts 2b, 2d normally open with respect to fixed contacts 2a, 2c respectively. Relay R3 is a double-pole double throw relay with two movable poles or contacts 3b, 3c normally closed with contacts 3e, 3d respectively and open with respect to fixed contacts 3a, 3f respectively. Relay R4 has a single movable contact 4a normally open with respect to contact 4b.

Coil C1 of relay R1 is connected to switch contact 120a and to contact 122b of switch 122. Switch 122 is a push-button type of microswitch which has normally closed contacts 122a, 122b. These contacts are open circuited when knife 90 is pulled downwardly by moving plunger 97 of solenoid 100 to cut web 43.

Motor 82 is connected between contact 120a of switch 120 and both one end of coil C1 and switch contact 122b. Relay contact 1a is connected to switch contact 120b of switch 120. Relay contact 1b is connected to one end of relay coil C2 and to relay contact 2d. Relay contact 1c is connected to relay contact 3c. Relay contact 1d is connected to switch contact 120a.

Relay coil C2 is connected at its other end to switch contact 122b. Relay contact 2a is connected to one end of solenoid coil 100, to one end of relay coil C4 and to relay contact 4a. Relay contact 2b is connected to relay contact 3a. Relay contact 2c is connected to power supply wire 152.

Relay coil C3 is connected to the output of amplifier 160. Photoelectric cell 60 is connected to the input of the amplifier. Relay contacts 3b and 3d and 4b are connected to power supply wire 152. Relay contacts 3e and 3f are open. Switch contact 122a is connected to terminal 32a of switch 32.

The apparatus including circuit 150 generally operates as follows. It will be assumed that a cycle of operation has been completed leaving a cut off mat M resting on plate 104 with its free end E extending out of the cabinet as shown in FIG. 1. The rear edge of the mat is located in the plane of the knife edge 91. The knife 90 is in the elevated position of FIG. 7. The forward edge of web 43 is located at the plane of the knife edge adjacent to the rear edge of cut off mat M. Switch 32 is closed. The web extends under the photoelectric assembly 56. Relay R3 is in the condition shown in FIG. 12 with contacts 3b, 3c closed with contacts 3e, 3d. The mat M is depressing switch arm 118 so that contacts 118', 120b are closed. The motor is stopped. Switch 122 is in the closed position shown in FIG. 12.

The cycle of operation is started by removal of the mat M on to a tray T as is shown being done by attendant A in FIG. 2. This energizes relay R1 because switch arm 118 is released as the mat M is removed and contacts 118′, 120a close. Motor 82 starts, and the web is pulled forward by rollers 75, 76. Relay contacts 1a, 1b and 1c, 1d close. A holding circuit for relay coil C1 is completed through closed relay contacts 1c, 1d and 3c, 3d. As the web advances the leading edge of the web encounters and depresses switch arm 118, but relay R1 remains energized due to the closed holding circuit. Thus the motor remains energized. When relay R1 first becomes energized upon removal of the mat M, the closing of contacts 1a, 1b causes relay R2 to be energized. Contacts 2a, 2b and 2c, 2d close. A holding circuit for relay R2 is closed through closed contacts 2c, 2d. The power supply circuit of solenoid 100 is alerted by closing of contacts 2a, 2b but is not completed due to the open condition of relay contacts 3a, 3b.

After the web 43 has been advanced a predetermined gate distance, a sensing spot or mark 68 reaches the scanning point P under the photoelectric assembly 56. This mark may have any convenient length ranging from 1/16 of an inch to as much as four inches. The circuit is arranged so that subsequent operation does not depend on the length of mark 68, which only acts to trigger subsequent operation.

When mark 68 is encountered by the scanning electric eye including lamp 58 and cell 60, a signal is applied to amplifier 160 which energizes relay R3 so that relay contacts 3a, 3b and 3c, 3f close while contacts 3b, 3e and 3c, 3d open. When contacts 3c, 3d open the power supply of the motor is cut off and the motor stops. When contacts 3a, 3b close they apply a voltage to coil 100 through closed relay contacts 2a, 2b. The knife 90 will thus start to descend. The scanned spot or mark may by this time have already passed the scanning point P since motor 80 cannot stop instantaneously. Due to inertia the motor may drive the web so that mark 68 may pass the scanning point P. When the mark 68 passes the scanning point P, relay R3 becomes deenergized and contacts 3a, 3b open. Relay R4 becomes energized when contacts 2a, 2b close. Thus even though relay contacts 3a, 3b open, relay R4 remains energized through its holding circuit which includes closed contacts 4a, 4b. The power supply circuit for solenoid 100 remains closed through closed contacts 4a, 4b so that the knife's descent is not interrupted and it comes down to cut the web leaving a cut off mat M in place closing switch contacts 118′, 120b. When the knife descends fully it opens switch 122 so that relays R2 and R4 are deenergized. Solenoid 100 becomes deenergized also and knife 90 is elevated again. R1 became deenergized when relay contacts 3c, 3d opened and remains deenergized. Relay R3 is deenergized due to the passage of mark 68 beyond scanning point P. As soon as switch 122 opens the cycle is completed, and it will start again upon removal of the cut off mat M from the apparatus.

It will be noted that the cycle starts independently of the position of relay R3. This is important because due to slight overrun of the motor a spot or mark 68 may initially be located at scanning point P. Nevertheless, the motor will start and drive the web for a gating distance of several inches until the mark passes the scanning point, due to the closure of contacts 1c, 1d upon removal of the cut off mat. The motor will continue to drive the web regardless of the position of relay R3 during this gating distance. Then when the next mark arrives at the scanning point P, the motor circuit is cut off and the motor stops even though the mark 68 is only 1/16 of an inch in length and passes position P instantly. This occurs because at the end of the gating distance, switch 120 is opened, and relay R1 is being held closely only by its closed holding circuit through closed contacts 3c, 3d. Once the contacts 3c, 3d open, even though only momentarily, the relay R1 becomes deenergized and the motor circuit is opened and remains open until mat M is removed from the apparatus. Cutting of the web takes place independently of the particular condition of relay R3, which is essential since a mark 68 may or may not have passed scanning position P at the time the motor has stopped. Relay R4 takes over the control of the solenoid to complete the cutting operation. The gating distance may be about four inches in length so that the apparatus can work with sensing marks of various lengths up to four inches.

Although circuit 150 shows a photoelectric sensing arrangement, it is possible to connect the relay R3 to a different type of sensor. For example, the sensor may be an adjustable length measuring device which applies a pulse to coil C3 or relay R3 when a predetermined length of web has passed the sensor. Alternatively, the sensor may be a device for passing an electric current to the coil C3 via a scanned electrically conductive mark on web 43. As further alternative, the mark 68 may be magnetic and the sensor replacing the photoelectric cell may be an electromagnetic sensing head which will apply a voltage to the coil C3 of the relay R3 when the magnetic mark is scanned by the electromagnetic head. It is not necessary to employ visible marks when a photoelectric cell is used. The marks 68 can be invisible, fluorescent and responsive only to ultraviolet light which will be generated by lamp 58. Photoelectric cell will then be one of a known type responsive to ultraviolet light. It is possible to make up sensors of each of the four types mentioned above, namely, the photoelectric, adjustable length measurer, electric current sensor and electromagnetic sensor. Each sensor will include a relay R3 and will be interchangeably connectable in place of any other sensor in circuit 150.

The length of mat M cut off depends on the spacing of marks or spots 68. The assembly 56 can be adjustably positioned on framework 60 longitudinally of the apparatus by moving bar 57 along the walls or rails 55, 57. One end of this bar is free on wall 57. The other end has two spaced depending flanges 190, 191 on opposite sides of wall 54 to serve as guide and clamping means; see FIGS. 6, 7, 10, 11. Screws 192 in outer flange 191 engage the outer side of wall 54 to lock the bar in place. Plate 53 has a channel shaped, frictionally fitted clamping member 194 engaged slidably on bar 57. This permits the assembly 56 to be adjustably positioned laterally of the table 52 depending on the location of the spots or marks 68 which are employed in the operation of the control system of the apparatus.

When the roll 42 of web 43 is exhausted, switch 32 is turned off and side wall 23 of the cabinet can be removed. New roll 42 can then be mounted on springs 44.

There has thus been provided according to the invention, an apparatus which operates automatically for dispensing one mat at a time. Each of the mats are cut off automatically one at a time from the end of roll of sheet material. The sheet material is drawn automatically through the apparatus in a cycle which is triggered by manual removal of a mat extending out of the front of the apparatus. Operation of the apparatus is safe, simple and foolproof. The roll of sheet material is maintained in a clean, sanitary condition in the cabinet enclosure at all times.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. Apparatus for dispensing mats made of thin sheet material, comprising a support, means for mounting a roll of said sheet material in said support, a horizontal table carried by said support, roller means for drawing a web of said sheet material from said roll in a forward path over said table, a motor driving said roller means, electrically operated cutter means disposed near one end of said table to cut off a predetermined length of said web, said length constituting one of said mats, switch means actuated by the presence of the cut off mat, sensing means disposed to scan said web on the table, relay means controlled by said sensing means, and an electric circuit interconnecting said motor, switch means, cutter means, relay means, and sensing means, whereby manual withdrawal of the cut off mat automatically operates said switch means to drive said motor, and whereby scanning by said sensing means of certain predetermined areas of said web at particular locations spaced longitudinally of the web automatically actuates said relay means to stop said motor and to actuate said cutter means after the motor is stopped.

2. Apparatus as recited in claim 1, wherein said predetermined areas are marks on said web, and wherein said sensing mens is a photoelectric assembly comprising a lamp for illuminating parts of said web and the marks on the web, and a photoelectric cell disposed to receive light reflected from said marks, said circuit means interconnecting said photoelectric cell and relay means electrically, said cell being responsive to light reflected from said areas to actuate the relay means in stopping the motor and actuating the cutter means.

3. Apparatus as recited in claim 1, wherein said switch means includes an operating arm disposed in the forward path of movement of said web for deflection by said web to actuate said switch means.

4. Apparatus as recited in claim 3, further comprising second switch means disposed adjacent to said cutter means, said cutter means including a knife normally elevated above said table, and an element rotated with the knife for actuating said second switch means when said knife is fully depressed to cut said web, said second switch means being connected in said circuit to cut off power to the cutter means and relay means when the knife is fully depressed.

5. Apparatus as recited in claim 4, wherein said relay means comprises a first relay connected in circuit with said switch means and with said motor for initially energizing the motor when said mat is removed from the table to release said operating arm, whereby the web is driven by the motor even though one of said areas is then in a position to be scanned by said sensing means.

6. Apparatus as recited in claim 5, wherein said relay means further comprises a second relay connected in circuit with the first relay for keeping said first relay and said motor energized when said web encounters and deflects the operating arm of the first mentioned switch means.

7. Apparatus as recited in claim 6, wherein said relay means further comprises a third relay connected in circuit with the first and second relays, and wherein said cutter means includes a solenoid having a reciprocatable plunger, said plunger being operatively connected to the knife for depressing the same, said solenoid being connected in circuit with the third relay and normally maintained in deenergized condition while said sensing means is scanning the web, said sensing means being connected in circuit with the second relay to actuate the same when another of said areas is scanned by the sensing means for deactivating the first relay and stopping the motor and for activating the second relay to energize the solenoid and start depressing the knife.

8. Apparatus as recited in claim 7, wherein said relay means further comprises a fourth relay connected in circuit with the second relay and energized thereby, said fourth relay having holding means to keep the same energized, said fourth relay being connected to said solenoid to keep the same energized after the motor is stopped independently of the operating condition of the second relay so that the knife completes its descent to cut the web and open the second switch means, whereby all relays are then in deenergized condition.

9. Apparatus as recited in claim 1, wherein said roller means includes spring loaded braking means for keeping the web in tension and for preventing free unwinding of the roll when the motor stops.

10. Apparatus as recited in claim 1, wherein said sensor is interchangeable with any one of a plurality of other sensors, said sensors including: photoelectric means for scanning visible marks on the web, photoelectric means for scanning invisible marks rendered fluorescent in the presence of ultraviolet light, electromagnetic means responsive to magnetic marks on the web, and electrically current conductive means responsive to electrically conductive marks on the web.

References Cited
UNITED STATES PATENTS 2,581,937    1/1952    Secrest _____ 83—358 X
3,293,967   12/1966    Sharpe _____ 83—358 X JAMES M. MEISTER, *Primary Examiner.*